(12) United States Patent
Cookson et al.

(10) Patent No.: US 10,099,371 B2
(45) Date of Patent: Oct. 16, 2018

(54) ROBOT WITH HOT-SWAPPED END EFFECTORS

(71) Applicants: Daniel Cookson, Rowley, MA (US);
Andrew Wallace, Needham, MA (US);
James Griffith, Cambridge, MA (US)

(72) Inventors: Daniel Cookson, Rowley, MA (US);
Andrew Wallace, Needham, MA (US);
James Griffith, Cambridge, MA (US)

(73) Assignee: RETHINK ROBOTICS, INC., Boston, MA (US)

( * ) Notice: Subject to any disclaimer, the term of this patent is extended or adjusted under 35 U.S.C. 154(b) by 0 days.

(21) Appl. No.: 15/463,682

(22) Filed: Mar. 20, 2017

(65) Prior Publication Data

US 2017/0190050 A1    Jul. 6, 2017

Related U.S. Application Data

(63) Continuation of application No. 14/833,660, filed on Aug. 24, 2015, now Pat. No. 9,630,315.

(51) Int. Cl.
| | |
|---|---|
| *B25J 9/16* | (2006.01) |
| *B25J 15/04* | (2006.01) |
| *G05B 19/12* | (2006.01) |
| *B25J 9/08* | (2006.01) |

(Continued)

(52) U.S. Cl.
CPC .............. *B25J 9/1646* (2013.01); *B25J 9/08* (2013.01); *B25J 9/1612* (2013.01); *B25J 15/0066* (2013.01); *B25J 15/0408* (2013.01); *B25J 15/0483* (2013.01); *B25J 15/0491* (2013.01); *G05B 19/128* (2013.01); *H05K 999/99* (2013.01); *B25J 19/0025* (2013.01); *G05B 2219/31095* (2013.01); *G05B 2219/39468* (2013.01); *G05B 2219/49304* (2013.01); *G05B 2219/50338* (2013.01); *Y10S 901/02* (2013.01)

(58) Field of Classification Search
CPC ... B25J 9/1617; B25J 9/08; B25J 15/04; B25J 15/0408; B25J 15/0491; B25J 15/0483; B25J 19/0025; G05B 2219/4141; G05B 2219/4148; G05B 2219/31095; G05B 2219/39468; G05B 2219/40304; G05B 2219/49304; G05B 2219/49305; G05B 2219/50338
See application file for complete search history.

(56) References Cited

U.S. PATENT DOCUMENTS

| | | |
|---|---|---|
| 6,331,181 B1 | 12/2001 | Tierney et al. |
| 7,239,940 B2 | 7/2007 | Wang et al. |
| 7,379,790 B2 | 5/2008 | Toth et al. |

(Continued)

OTHER PUBLICATIONS

European Search Report, European Application No. 16184002.0, dated Jan. 25, 2017, 10 pages.

*Primary Examiner* — Dale Moyer
(74) *Attorney, Agent, or Firm* — Morgan, Lewis & Bockius LLP (57) ABSTRACT

Robots capable of accommodating dynamic replacement of end effectors load and run software that allows the end effector to be operated without change to the main control program. The driver may be dynamically linked and run during program execution when the corresponding end effector is detected. Typically, the robot controller will store a library of drivers, and load the appropriate driver when a new end effector is detected.

18 Claims, 6 Drawing Sheets

(51) Int. Cl.
*B25J 15/00* (2006.01)
*B25J 19/00* (2006.01)

(56) References Cited

U.S. PATENT DOCUMENTS

| | | |
|---|---|---|
| 8,224,484 B2 | 7/2012 | Swarup et al. |
| 8,452,447 B2 | 5/2013 | Nixon |
| 8,844,789 B2 | 9/2014 | Shelton, IV et al. |
| 2003/0226887 A1* | 12/2003 | Komine ............. B23Q 3/15546 235/375 |
| 2005/0065647 A1* | 3/2005 | Perry ....................... B25J 9/161 700/245 |
| 2009/0044655 A1* | 2/2009 | DeLouis .................. B25J 15/04 74/490.05 |
| 2010/0180711 A1 | 7/2010 | Kilibarda et al. |
| 2010/0241260 A1 | 9/2010 | Kilibarda et al. |
| 2010/0267270 A1 | 10/2010 | Jehmlich et al. |
| 2012/0207538 A1* | 8/2012 | Rizk ....................... B25J 15/04 403/315 |
| 2012/0298706 A1 | 11/2012 | Gordon et al. |
| 2013/0274918 A1 | 10/2013 | Zurbau |
| 2013/0340560 A1 | 12/2013 | Burridge et al. |
| 2014/0180310 A1 | 6/2014 | Blumenkranz et al. |
| 2014/0276951 A1 | 9/2014 | Hourtash et al. |
| 2014/0363223 A1* | 12/2014 | Goto ................... B25J 15/0408 403/326 |
| 2015/0032252 A1 | 1/2015 | Galluzzo et al. |
| 2015/0088300 A1 | 3/2015 | Kilibarda et al. |
| 2015/0120041 A1* | 4/2015 | Wise ................... B25J 19/0095 700/245 |
| 2016/0250753 A1* | 9/2016 | Yoshizawa ........... B25J 15/0466 700/258 |
| 2017/0057085 A1 | 3/2017 | Cookson et al. |

\* cited by examiner

ROBOT WITH HOT-SWAPPED END EFFECTORS

RELATED APPLICATION

This application is a continuation of U.S. patent application Ser. No. 14/833,660, filed Aug. 24, 2015, the entire disclosure of which is hereby incorporated by reference.

FIELD OF THE INVENTION

The present invention relates, generally, to robot operation and training. More specifically, various embodiments relate to the acquisition, organization, and use of task-related information by industrial robots to facilitate performance of tasks in an autonomous manner.

BACKGROUND OF THE INVENTION

Industrial robots perform a variety of tasks involving the movement and manipulation of physical objects. A typical industrial robot may, for example, have one or more arms, equipped with grippers, that allow the robot to pick up objects at a particular location, transport them to a destination location, and put them down in accordance with particular coordinates, thereby, for example, stacking them or placing them into cardboard boxes present at the destination location.

Robots may manipulate different types of objects and perform many tasks beyond simply moving them—for example, welding, joining, applying fasteners, etc. As a result, many different "end effectors" have been developed for deployment on robot appendages; some of these end effectors, such as grippers, have utility across a range of tasks, while others, such as weld guns, are designed to perform a single, specialized task. To promote versatility, a commercial robot may accommodate different end effectors. For example, different end effectors may share a common linkage design that permits them to be interchangeably mounted to the cuff or wrist of a robot arm. Accommodating the robot to the end effector operationally is more difficult. Frequently, selection of the end effector for a robot occurs during system integration or assembly and is essentially permanent; the programming necessary to operate the selected end effector is written into the controller code for the robot. In some robots, end effectors may be changed dynamically during operation, but typically this occurs at preprogrammed phases of task execution; that is, the robot controller code signals the need for a new end effector when the code governing the next task expects a replacement. Even dynamic changes in the robot's end effector, in other words, occur in response to robot expectation as it executes tasks or when the robot is outfitted for a new task.

What is needed, therefore, is a more versatile approach to hot-swapping of end effectors that permits arbitrary replacement by the operator and dynamic accommodation by the robot. The operator, for example, may find during operation that the task being performed by the robot unexpectedly requires finer control than the current set of grippers permits. In such circumstances, the operator will want to replace the existing grippers with a more suitable end effector, but without rewriting the robot's task-execution code.

SUMMARY OF THE INVENTION

The present invention relates to robots capable of accommodating dynamic replacement of end effectors, and hardware and software associated with the end effectors that facilitate communication with the robot to dynamically load and run software that allows the end effector to be operated without change to the main control program. Such effector-specific programming is herein generically referred to as a "driver." The driver may be dynamically linked and run during program execution when the corresponding end effector is detected. Typically, the robot controller will store a library of drivers, and load the appropriate driver when a new end effector is detected; this process is referred to herein as "self-configuration." The controller code itself, however, may issue generic commands not tied to any particular driver but to which appropriate drivers are coded to respond. This avoids the need to make changes at the controller-code level to accommodate different end effectors.

The term "configuration data" or "configuration information" refers to information identifying or helping to instantiate (e.g., select and parameterize) the proper driver for a particular end effector. Thus, configuration data may be an actual driver, parameters used to tailor a generic driver to a particular end effector, or merely an identifier for the type of driver needed. The term "identifier" or "identification data" refers to information that identifies the end effector and that may be combined with or used to locate appropriate configuration information for the end effector. As explained below, drivers, configuration data and identifiers can be variously distributed among components of a system depending on design priorities and preferences.

In various embodiments, the end effector is not connected directly to the robot appendage but instead to a "tool plate" that is removably mounted to the distal end of the robot appendage. The tool plate receives the end effector mechanically and may supply power and, in some cases, data signals thereto. Various types and degrees of functionality can be distributed between the end effector and the tool plate, and the latter may accommodate more than one type of end effector. This arrangement facilitates flexible deployment of capabilities as best suited to a particular robot architecture; for example, one component may be "dumb" (e.g., incapable of communication or data processing) and the other "smart" (e.g., capable of communicating with the robot and performing data-processing operations). Thus, one implementation features a "dumb" end effector and a "smart" tool plate. The smart tool plate may detect which of multiple types of connectable end effectors has been attached to it (e.g., based on electrical characteristics or the mechanical configuration of the end effector's connector), reporting this to the robot controller, which loads the appropriate driver. Alternatively, the smart tool plate may accommodate only a single type of end effector, in which case it need only report its own identity to the robot controller, since this is sufficient to determine the proper driver.

Another implementation features a "smart" end effector and a "dumb" tool plate, in which case the tool plate merely facilitates communication between the end effector's onboard processor or controller and the robot controller; the end effector reports its identity in a wired or wireless fashion to the robot controller. In this configuration, the tool plate may, for example, serve as an adapter between the robot appendage and a mechanically incompatible end effector. As explained below, "reporting" may be active (the "smart" component may initiate communication with the robot controller on its own and send information) or passive (the "smart" component may respond to a polling signal or other communication from the robot controller, which has detected attachment).

Accordingly, in a first aspect, the invention relates to a robot system with replaceable end effectors. In various embodiments, the robot system includes a robot body; a robot arm connected to the robot body and having a distal end including a first connector; a robot controller for controlling the robot arm and an end effector connected thereto; an end-effector removably connectable to the robot arm, where the end-effector assembly includes (1) an end effector; (2) nonvolatile memory storing data comprising identification information and/or configuration information; (3) a communication interface; (4) a processor; and (5) a second connector removably but securely matable with the first connector for establishing bidirectional communication between the processor and the robot controller via the communication interface. The processor is configured to cause transmission of the data to the robot controller upon mating of the first and second connectors, and the robot controller is adapted to self-configure based on the data and to control movements of the connected end effector based on the self-configuration.

In various embodiments, the first connector is disposed in a tool plate that is itself disposed at the distal end of the robot arm and removably connected thereto. The end effector is connected to the opposite side of the tool plate. The tool plate includes the nonvolatile memory, the processor and the communication interface. In some implementations, the tool plate is adapted to mate with a single type of end effector and stores the identification and/or configuration information relating thereto. In other implementations, the tool plate may accommodate multiple types of end effectors and store identification and/or configuration information for each end-effector type. Mating of the end effector to the tool plate establishes the end-effector type either mechanically or by means of data exchange. The tool plate, in turn, communicates with the robot controller to provide the identification and/or configuration information thereto.

As noted, the robot controller self-configures based on the deployed end effector. In some embodiments, the end-effector assembly supplies both identification and configuration information, e.g., a driver that the controller programming uses to operate the end effector. In other embodiments, the end-effector assembly supplies only identification information, and the controller locates the appropriate driver. For example, the controller (or other robot component) may store a series of drivers and a database relating end effectors to corresponding drivers. Once the controller learns the identity of the end effector, it selects and loads the appropriate driver based on the database entry corresponding to the identified end effector (without change to the main control program). If the controller is unable to locate a suitable driver, it may seek the driver remotely, either by communicating with a server acting as a master repository of drivers for end effectors, or by autonomously conducting an Internet search for suitable drivers and, if one is found, downloading and installing it.

In another aspect, the invention again relates to a robot system with replaceable end effectors. In various embodiments, the robot system includes a robot body; a robot arm connected to the robot body and having a distal end including a first connector; a robot controller for controlling the robot arm and an end effector connected thereto via the first connector; a tool plate removably connectable to the robot arm; and an end effector connected to the tool plate, where the tool plate includes (1) nonvolatile memory storing data comprising at least one of identification information or configuration information; (2) a communication interface; (3) a processor; and (4) a second connector matable with the first connector for establishing bidirectional communication between the processor and the robot controller via the communication interface. The processor is configured to cause transmission of the data to the robot controller upon mating of the first and second connectors, and the robot controller is adapted to self-configure based on the data and to control movements of the connected end effector based on the self-configuration.

In some embodiments, the data includes both identification information and configuration information. In other embodiments, the data does not include configuration information, and the robot system further comprises a database including records relating end-effector identification information to configuration information for the end effector. The controller is further adapted to query the database using the identification information to obtain the corresponding configuration information and to self-configure based thereon.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1A:
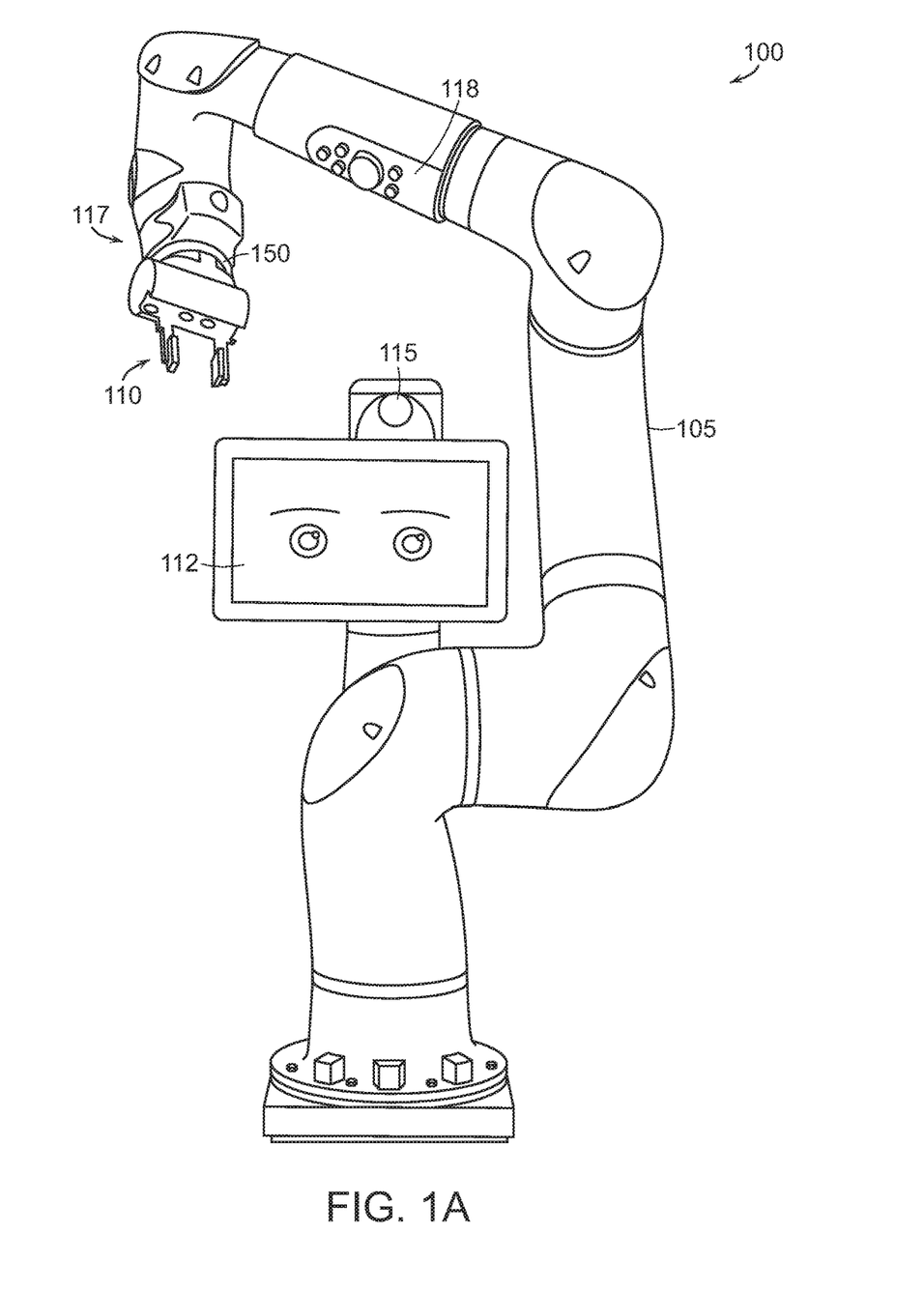
FIG. 1A is a perspective view of a robot in accordance with various embodiments.
Figure 1B:
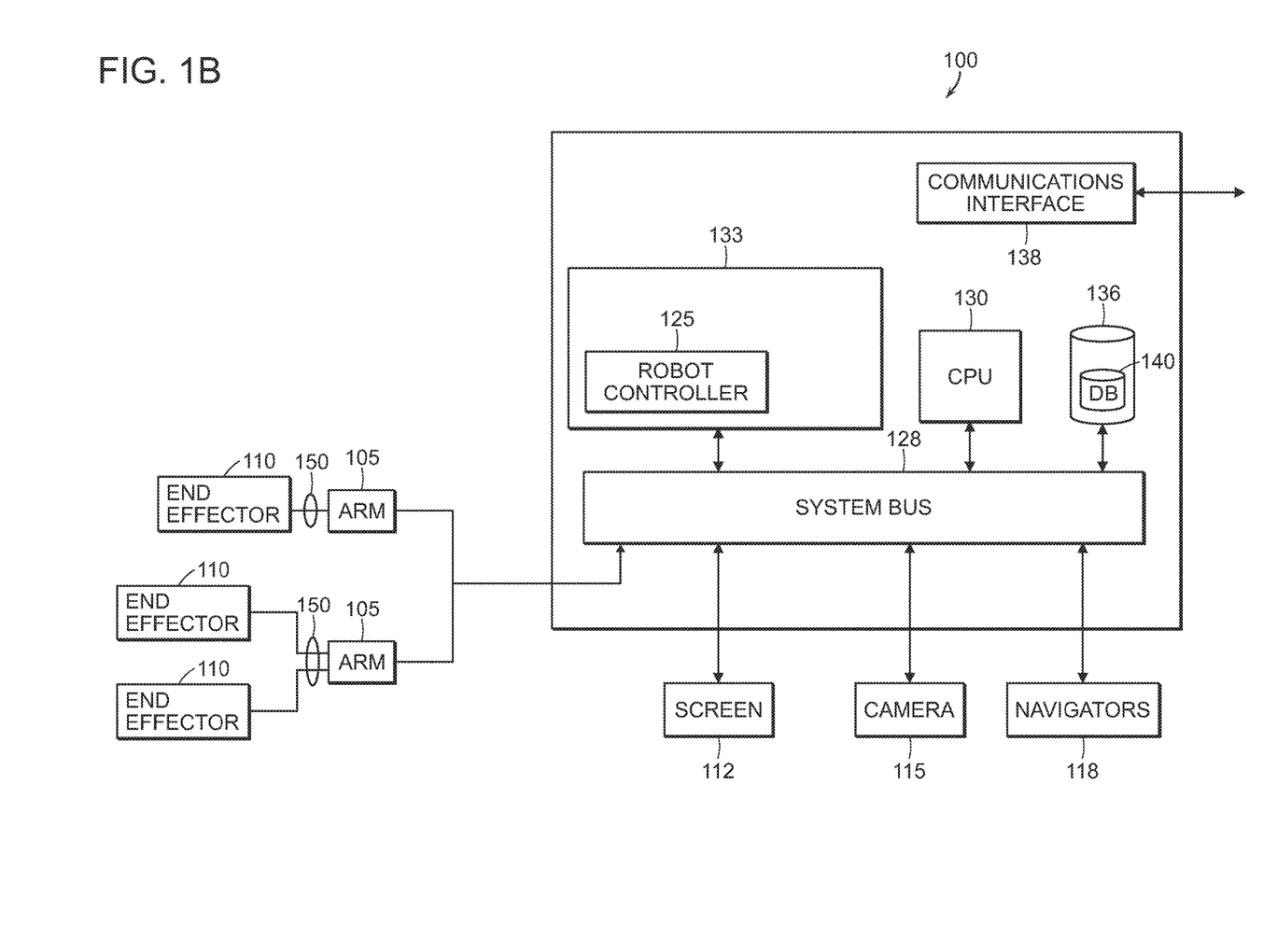
FIG. 1B schematically illustrates internal and external components of the robot shown in FIG. 1A.

Refer first to FIGS. 1A and 1B, which illustrate, respectively, a perspective view of a representative robot 100 and a schematic detailing the various internal operative components. The robot 100 includes at least one robot arm 105—as shown in FIG. 1B, a robot may have more than one arm—that terminates in one or more end effectors 110 for manipulating objects. The arm 105 has several (e.g., seven) degrees of freedom provided by suitable (and conventional) rotational joints. Each joint desirably employs a series elastic actuator, enabling the robot to sense external forces applied to it, such as, e.g., forces resulting from unexpected collisions. In the embodiment illustrated in FIG. 1A, a parallel-jaw gripper 110 that allows the robot to grasp, lift, and move objects is mounted at the end of the arm 105; as explained below, the gripper 110 is just one of many possible end effectors. The robot 100 also has a head-like screen 112, which may display a pair of eyes or other output reinforcing the robot's orientation to nearby personnel or announcing its state. In some embodiments, the screen 110 can rotate about a vertical access, and nod about a horizontal axis running parallel to the long axis of the screen 110.

The robot 100 includes one or more cameras 115. In FIG. 1A, a camera 115 is shown above the screen 112. The robot 100 may also include one or more range sensors in the wrist 117 of the appendage 105, and in some embodiments, one or more sonar sensors detects moving objects in the environment. In addition to these sensors for visually and/or acoustically detecting objects, the robot 100 may include a number of touch-sensitive sensors and mechanical features on the arm 105 that facilitate mechanical interaction with a person (e.g., a trainer). For example, the robot 100 may include a set 118 of knobs and buttons (a "navigator") that allows the user to respond to information displayed on the screen 112 (e.g., by selecting menu items, switching between training and execution mode) and enter numbers (e.g., to indicate in how many rows and columns objects are to be packed in a box) or text (e.g., passwords or object and task names) via a digital rotary knob.

The robot 100 described above is, of course, only one of many possible robot embodiments in accordance with the invention, and the various features described above are representative rather than limiting. Various components and features can be modified in manners that will be readily apparent to persons of skill in the art. For example, the robot may, generally, have any number of arms (or, more generally, appendages), and each arm may have any number of degrees of freedom. The links of the arms need not be joined by rotational joints with one degree of freedom (such as, e.g., hinge joints), but may, for example, include ball-and-socket joints that provide two rotational degrees of freedom, or rail systems that facilitate translational motion.

Robot operation is governed by a robot controller 125, which monitors and alters robot positions, kinematics, dynamics, and forces; controls joint-level actuators to move the robot and/or its moving parts as directed by the robot controller; and high-level computational functionality that facilitates image-processing, user interaction, etc. The robot controller 125 may generally be implemented in hardware, software, or a combination of both on a general-purpose or special-purpose computer, which includes a bidirectional system bus 128 over which the central processing unit (CPU) 130, memory 133, and storage devices 136 communicate with each other as well as with internal or external input/output devices such as the screen 112, the camera 115, navigators 118, wrist cuffs, and any other input devices and/or external sensors. A conventional communication interface 138 facilitates communications over a network, such as the Internet and/or any other land-based or wireless telecommunications network or system. The storage devices 136 store an end-effector database 140 which, as explained in greater detail below, maintains information relevant to the various types of end effectors 110 that may be associated with the robot 100. The various modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. The robot controller 125 may be implemented in software, hardware, or a combination.

The end effector 110 is connected to the robot arm 105 via a tool plate 150, which may accommodate more than one type of end effector 110 and, in some implementations, more than one end effector at a time. In this way, the tool plate 150 acts as a "universal" connector that is mechanically and electrically connected to the robot 100 via the robot arm 105, and which receives mechanical and electrical connectors from the end effector 110. In addition, the tool plate 150 assists the robot controller 125 in locating and installing the appropriate driver for a particular end effector 110. In various embodiments, the tool plate 150 may alert the robot controller when an end effector has been removed and replaced with a different (but compatible) end effector, providing information that allows the controller 125 to locate, load, and run the appropriate new driver in real time. The tool plate 150 may be one of several differently configured tool plates, each having identical mechanical and electrical connectors for mating with the robot arm 105 but different receptacles for receiving different end effectors. In this way, it is possible to accommodate more end effectors than the number of receptacles a single tool plate could physically support, and also facilitates system extensibility: as new end effectors with different connector configurations are developed, it is not necessary to replace the entire robot 100 or even the robot arm 105; rather, the ability to swap tool plates 150 means it is only necessary to design a new tool plate. Features of the tool plate 150 described below provide flexibility in this regard.

Figure 2A:
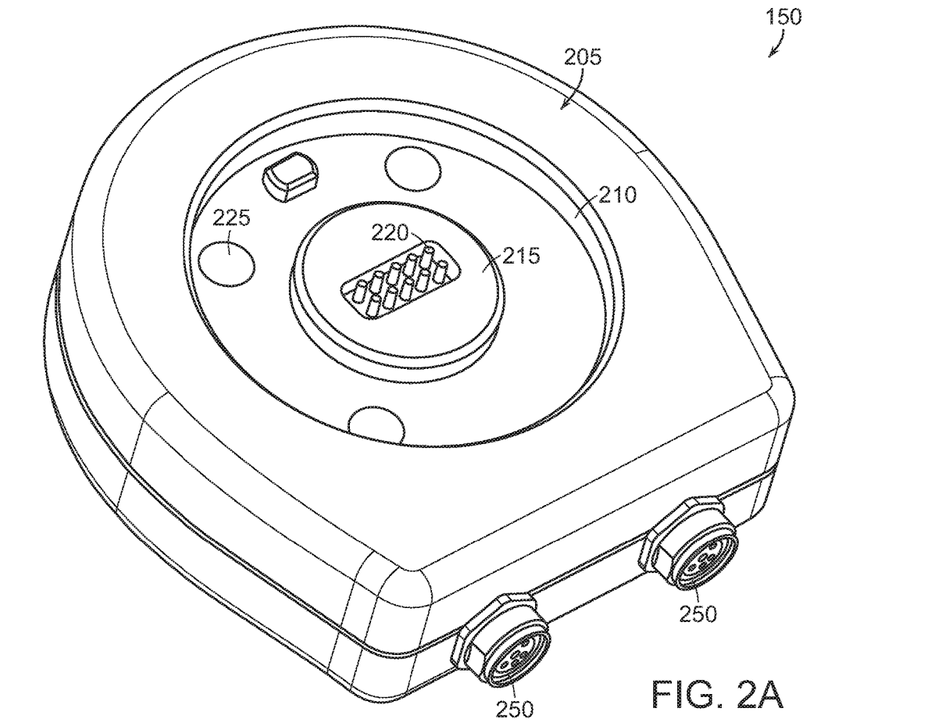
FIGS. 2A and 2B are perspective views of a tool plate in accordance with embodiments of the invention.
Figure 2B:
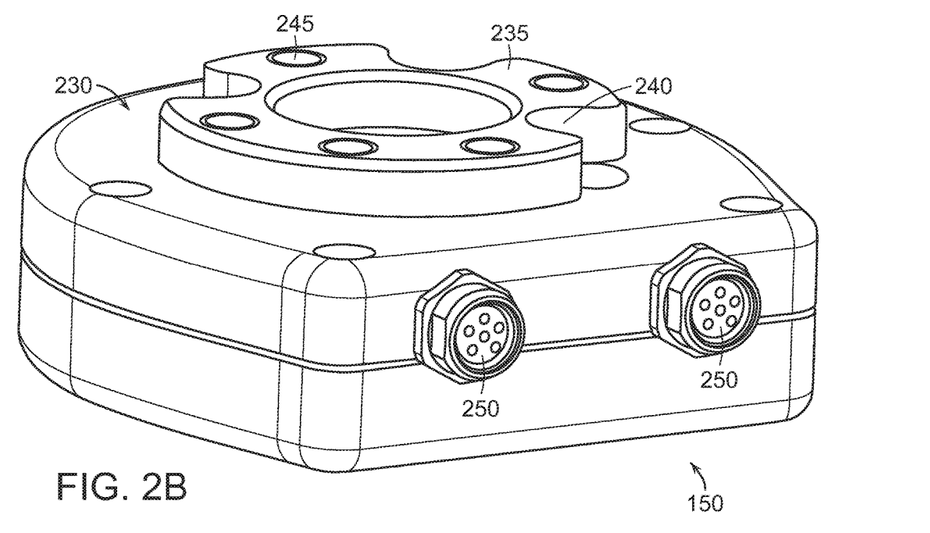
Figure 3A:
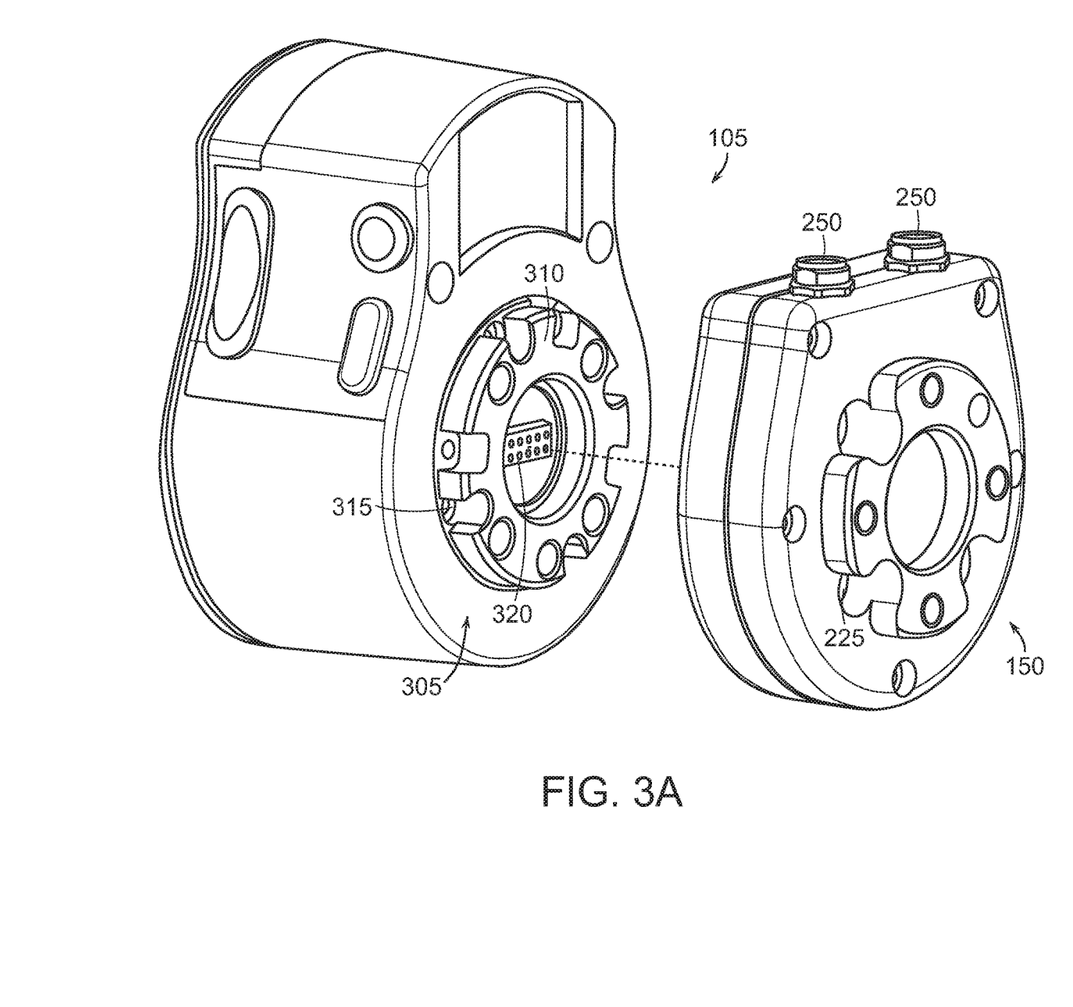
FIGS. 3A and 3B are perspective and plan views, respectively, that show the manner in which a tool plate in accordance herewith may mate with the end of a robot arm.
Figure 3B:
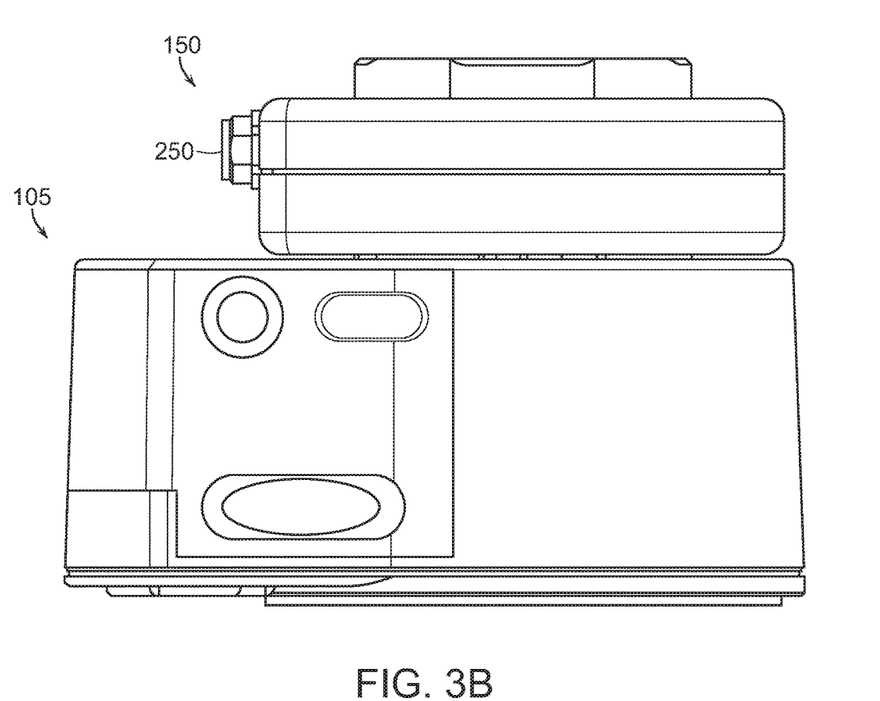

FIGS. 2A and 2B illustrate both faces of a representative tool plate 150, and FIGS. 3A and 3B depict its attachment to the end of a robot arm. The face 205 includes a recess 210 having a circular perimeter and, at the center of the recess 210, a raised platform 215 within which are 10 spring-loaded pins (pogo pins) 220 for establishing removable electrical connection to complementary receptacles. A plurality of bores 225 extend through the tool plate 150 and allow bolts to be passed through for secure attachment to the robot arm. In the illustrated embodiment, the effector-facing face 230 includes a raised annular ridge 235 with indentations 240 exposing the bores 225. In some embodiments, these indentations 240 interlock with complementary extensions into the annular recess on the end effector (not shown) that receives the ridge 235. A series of bolt holes 245 along the top surface of the ridge 235 allow the end effector to be secured to the tool plate 150. In the illustrated embodiment, attachment of an end effector to the face 230 results only in a mechanical connection. Electrical signals and power are delivered to the mounted end effector by a pair of electrical connectors (e.g., M8 industrial connectors), which are connected via suitable cables to the end effector. As explained in detail below, the electrical signals and power typically originate with the robot controller and are received by the tool plate 150 via the pin connectors 220. The tool plate 150 may include circuitry that converts signals and/or power received from the robot into a different form for the end effector mounted thereto.

With reference to FIGS. 2A and 3A, the tool plate 150 is brought into contact with the end face 305 of the robot arm 105, and the raised annular ridge 310 on the end face 305 is received within the complementary recess 210 of the tool plate 150. A series of bolt holes 315 align with the bores 225 through the tool plate, allowing the tool plate 150 to be bolted or otherwise mechanically secured to the robot arm 105; in some embodiments, however, a quick-release latch is used instead of bolts. The pin connectors 220 are received in a receptacle 320 as the tool plate 150 and the robot arm 105 assume the mated configuration illustrated in FIG. 3B.

Figure 4:
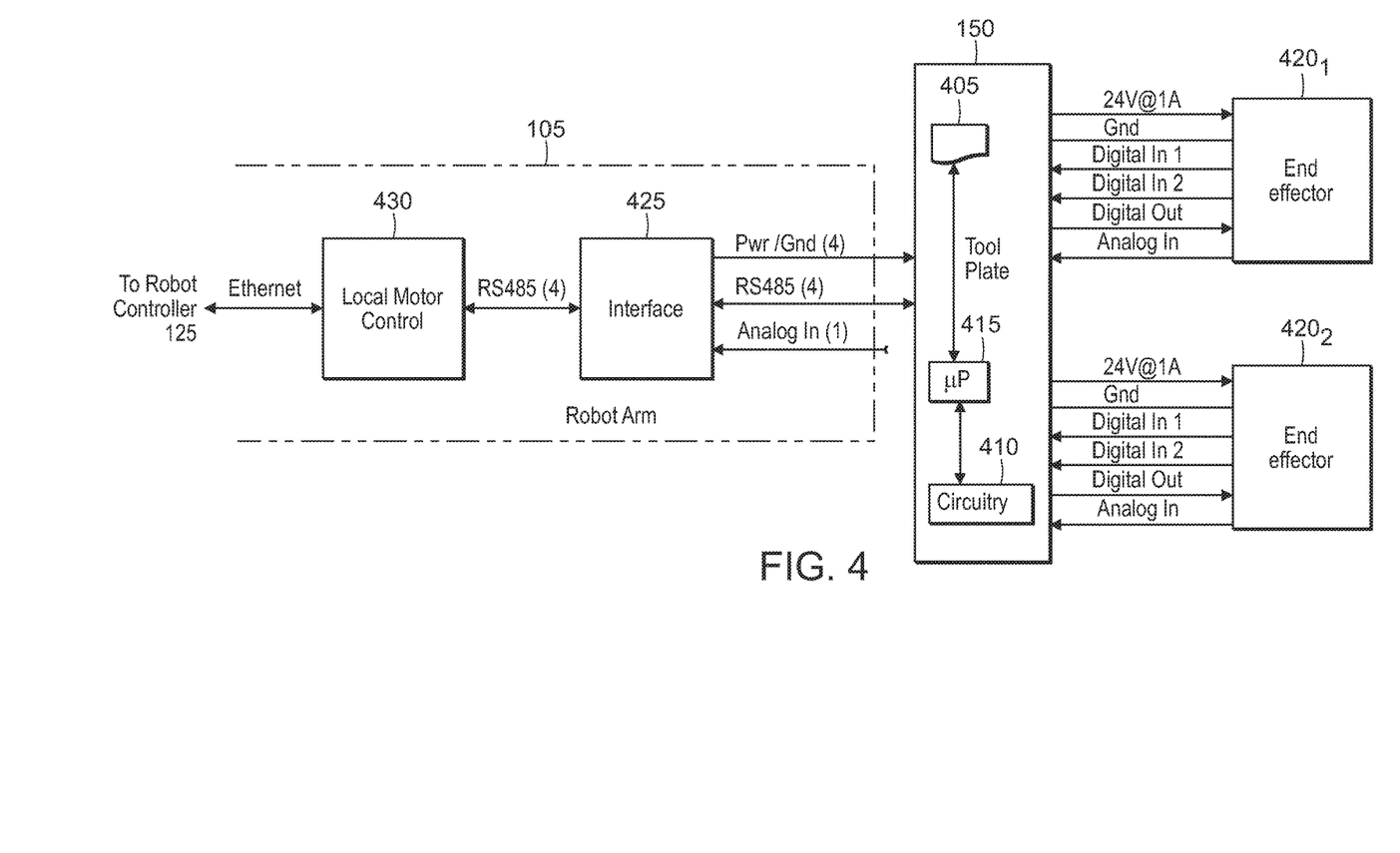
FIG. 4 schematically depicts an interoperating system including a robot arm, a tool plate, and a pair of end effectors in accordance with embodiments hereof.

The operation and key internal components of the tool plate 150 are illustrated in FIG. 4. The tool plate includes a memory 405, support circuitry 410, and a control element 415 that may be a microprocessor, microcontroller, or other suitable component. The capabilities of the control element 415 depend on the functions assigned to the tool plate 150, as described below. The tool plate mechanically and electrically mates with one or more end effectors 420, two of which are representatively shown at $420_1$, $420_2$; that is, the tool plate 150 has two receptacles, one for each of the end effectors 420, and each containing appropriate features to facilitate mechanical and electrical mating therewith. As noted above, the tool plate 150 may simultaneously accommodate more than one end effector 420 and/or may interchangeably accommodate different types of end effectors. For example, instead of grippers with fingers that close around an object as shown in FIG. 1, an end effector 420 may include suction grippers or other means of holding or manipulating an object. Alternatively or additionally, the end effector may be a tool (such as a drill, saw, welder, etc.), a measuring device (such as e.g., a scale, gauge, etc.) or other function-implementing device.

When mated mechanically and electrically with the robot arm 105, the tool plate 150 receives power and establishes communication with the robot controller 125 (see FIG. 1B). Typically, this occurs via intermediary hardware such as an interface 425 and a local motor controller 430. The interface supplies power from the robot to the tool plate 150 and supports bidirectional data communication with the tool plate 150 via, for example, the RS-485 serial communication protocol; the support circuitry 410 of the tool plate 150 contains complementary communication components. The local motor controller 430 receives commands from the robot controller 125 (via, for example, a link-layer protocol such as Ethernet) and actuates motors associated with one or more nearby joints of the robot arm 105 to effect the commands. In the illustrated implementation, the local controller 430 also receives commands from the robot controller 125 that operate the end effectors 420. It communicates these commands to the tool plate 150 via the interface 425 (using RS-485, for example), and the tool plate 150 issues commands (or provides power) to the addressed end effector via the Digital Out line. The commands are typically low-level commands specific to the end effector. That is, although the tool plate 150 could be configured to accept high-level, generic commands from the robot controller 125 and translate these into effector-specific signals, usually this is not done; rather, in more typical implementations, the robot controller 125 has "self-configured" to deliver effector-specific commands. The manner in which this may be accomplished is explained below. It should also be emphasized that the robot arm 105 may itself include a processor that can perform higher-level tasks. Thus, while the processor 415 may act as a "master" to control communications with the robot arm 125, it may instead act as a "slave" to a processor in the robot arm (which may, for example, poll the tool plate 150 and transmit data to the robot controller).

When an end effector 420 is mated with the tool plate 150, various communications take place whose end result is to provide power to and enable communication between the robot controller 125 and the end effector 420, but also to enable the robot controller to self-configure in order to operate the end effector. In one representative implementation, the end effector is a "dumb" device with no onboard information to offer the robot controller. The tool plate 150 recognizes the end effector because of the receptacle configuration (e.g., it is designed to accept a single type of end effector), or from its mechanical and/or electrical characteristics, or because the tool plate accommodates only one type of end effector. In the illustrated embodiment, the memory 405 stores an identifier for each of the two possible end effectors $420_1$, $420_2$. When the control element 415 detects attachment of a particular end effector, it communicates the corresponding identifier to the robot controller 125 via the robot arm 105. The robot controller uses the communicated identifier to locate, in the database 140 (see FIG. 1B), configuration information for the end effector. The database 140 may contain a library of configuration information (e.g., drivers or pointers to drivers stored elsewhere), and upon selection of the driver information based on the received end-effector identifier, the robot controller 125 self-configures, i.e., loads and installs the proper driver. Because the tool plate 150 can detect both installation and removal of an end effector, these may be "hot swapped" in real time without powering down and re-booting the robot; via the circuitry 410, the control element 415 will alert the robot controller 125 that a new end effector has been attached, and provide the identifier for the new end effector.

Detecting attachment of an end effector, either by the tool plate 150 or by the robot controller 125 (if, for example, the end effector is attached directly to a robot arm 105), can occur in an active or passive fashion. For example, the end effector or tool plate can initiate communication with the robot controller or the tool plate. Alternatively, the end effector or tool plate can, upon attachment, emit a characteristic signal that is detected by the robot controller polling for that signal. In either case, the robot controller 125 (or, in some implementations, the robot arm 105) sends commands to the end effector or the tool plate, which responds with data (I/O or status data, or stored configuration/identification data, depending on the command).

In some embodiments, the configuration information is stored in the memory 405 of the tool plate 150, and upon detecting attachment of an end effector, the control element 415 locates the corresponding configuration information in the memory 405 and transmits this to the robot controller 125. Once again, the configuration information may be the driver itself or a pointer thereto, enabling the robot controller 125 to download the latest version of the driver before self-configuring, or information that enables the robot controller 125 to parameterize a generic driver for the particular end effector. The memory 405 can also store end-effector-specific metrics such as cycle counts and hours of operation, allowing for preventive maintenance such as replacing suction cups when they are near their rated cycle limit.

In various implementations, any of the receptacles 420 can accommodate more than one type of end effector. In such cases, the end effector may store an identifier that is provided to (or retrieved by) the tool plate 150 upon establishing communication with a newly installed end effector. In this case, the tool plate 150 communicates the identifier to the robot controller 125 or, in some embodiments, uses the identifier to retrieve configuration information from the memory 405 and sends this information to the robot controller 125. The optimal distribution of information—i.e., whether to store configuration information on the tool plate 150 or in nonvolatile memory on the robot itself—represents a design choice. The more information that is stored on the tool plate 150, the more generic the robot can be, but the more memory the tool plate 150 will require. Another consideration is the need to update information or programming. For example, if the configuration data is subject to change over time, it may be desirable to store only unchanging information, such as an end-effector identifier, in the memory 405; the robot controller 125 can verify, at power-up or when installation of a new robot arm is detected, that it has the most current driver. It is possible, of course, to include functionality on the tool plate 150 enabling it to check for updates to stored configuration information before providing it to the robot, but such capability requires either on-board connectivity or the ability to access the network resources (e.g., via the Internet) through the robot.

In cases where the end effector is "smart," i.e., contains its own configuration information, this can be retrieved by the tool plate 150 and provided to the robot controller 125. It is even possible for the tool plate 150 to communicate wirelessly with end effectors and/or the robot controller 125 using a suitable on-board wireless interface. If, on the other hand, the robot controller 125 is unable to locate a suitable driver, it may search for a driver in a remote (e.g., hosted) repository of drivers or may autonomously conduct an Internet search for the proper driver, installing and testing proper operation and functionality via the tool plate 150 before actually allowing the robot to operate normally.

As previously noted, the control element 415 of the tool plate 150 may be any suitable microprocessor or microcontroller, depending on the functions that the tool plate is to perform. For example, the control element 415 may be a programmable microcontroller designed expressly for embedded operation, or one or more conventional processors such as the Pentium or Celeron family of processors manufactured by Intel Corporation of Santa Clara, Calif. The memory 405 may store programs and/or data relating to the operations described above. The memory 405 may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. In particular, embodiments of the invention need not include all of the features or have all of the advantages described herein. Rather, they may possess any subset or combination of features and advantages. Accordingly, the described embodiments are to be considered in all respects as only illustrative and not restrictive.

What is claimed is:

1. A tool plate for use with a robot system, the robot system comprising (i) a robot body, (ii) a robot arm connected to the robot body, the robot arm having a distal end including a robot connector, and (iii) a robot controller for controlling the robot arm and an end effector connected thereto via the tool plate, the tool plate comprising:
   nonvolatile memory storing data comprising at least one of identification information or configuration information;
   a communication interface;
   a processor;
   a first tool-plate connector matable with the robot connector for establishing bidirectional communication between the processor and the robot controller via the communication interface, the processor being configured to cause transmission of the data to the robot controller upon mating of the first tool-plate and robot connectors; and
   a second tool-plate connector, different from the first tool-plate connector, matable with the end effector via an end-effector connector,
   wherein the tool plate is a unitary component removably connectable to the robot arm and removably connectable to the end effector.

2. The tool plate of claim 1, wherein the data includes both identification information and configuration information.

3. The tool plate of claim 1, further comprising a third tool-plate connector matable with an end-effector connector of a second end effector of a type different from that of the end effector.

4. The tool plate of claim 1, wherein the data includes configuration information.

5. The tool plate of claim 4, wherein the configuration information specifies a driver for controlling the end effector.

6. The tool plate of claim 5, wherein the configuration information comprises the driver.

7. The tool plate of claim 5, wherein the configuration information comprises one or more parameters usable to tailor a generic driver to the end effector.

8. The tool plate of claim 5, wherein the configuration information comprises an identifier specifying a type of the driver.

9. The tool plate of claim 1, further comprising circuitry for supporting bidirectional communication between the robot controller and the end effector.

10. A tool plate for use with a robot system, the robot system comprising (i) a robot body, (ii) a robot arm connected to the robot body, the robot arm having a distal end including a robot connector, and (iii) a robot controller for controlling the robot arm and an end effector connected thereto via the tool plate, wherein the robot controller is adapted to self-configure based on data from the tool plate and to control movements of the connected end effector based on the self-configuration, the tool plate comprising:
    nonvolatile memory storing data comprising at least one of identification information or configuration information;
    a communication interface;
    a processor;
    a first tool-plate connector matable with the robot connector for establishing bidirectional communication between the processor and the robot controller via the communication interface, the processor being configured to cause transmission of the data to the robot controller upon mating of the first tool-plate and robot connectors; and
    a second tool-plate connector, different from the first tool-plate connector, matable with the end effector via an end-effector connector,
    wherein the tool plate is a unitary component removably connectable to the robot arm and removably connectable to the end effector.

11. A robot system comprising: a robot comprising (i) a robot body, (ii) a robot arm connected to the robot body, the robot arm having a distal end including a first connector, (iii) a robot controller for controlling the robot arm and an end effector connected thereto via the first connector, and (iv) a database including records relating end-effector identification information to configuration information for the end effector; and
    a tool plate comprising:
        nonvolatile memory storing data comprising identification information;
        a communication interface;
        a processor; and
        a second connector matable with the first connector for establishing bidirectional communication between the processor and the robot controller via the communication interface, the processor being configured to cause transmission of the data to the robot controller upon mating of the first and second connectors,
    wherein (i) the tool plate is removably connectable to the robot arm, and (ii) the data stored in the nonvolatile memory does not include configuration information the robot controller being further adapted to query the database using the identification information to obtain the corresponding configuration information and to self-configure based thereon.

12. A tool plate for use with a robot system, the robot system comprising (i) a robot body, (ii) a robot arm connected to the robot body, the robot arm having a distal end including a first connector, and (iii) a robot controller for controlling the robot arm and an end effector connected thereto via the first connector, the tool plate comprising:
- nonvolatile memory storing data comprising identification information and configuration information;
- a communication interface;
- a processor; and
- a second connector matable with the first connector for establishing bidirectional communication between the processor and the robot controller via the communication interface, the processor being configured to cause transmission of the data to the robot controller upon mating of the first and second connectors,
- wherein (i) the tool plate is removably connectable to the robot arm, and (ii) the configuration information specifies a driver for controlling the end effector.

13. The tool plate of claim 12, wherein the configuration information comprises the driver.

14. The tool plate of claim 12, wherein the configuration information comprises one or more parameters usable to tailor a generic driver to the end effector.

15. The tool plate of claim 12, wherein the configuration information comprises an identifier specifying a type of the driver.

16. The tool plate of claim 12, wherein the robot controller is adapted to self-configure based on the data and to control movements of the connected end effector based on the self-configuration.

17. The tool plate of claim 12, further comprising a third connector matable with a fourth connector of a second end effector of a type different from that of the end effector.

18. The tool plate of claim 12, further comprising circuitry for supporting bidirectional communication between the robot controller and the end effector.

* * * * *